(12) United States Patent
Marioni

(10) Patent No.: US 7,097,434 B2
(45) Date of Patent: *Aug. 29, 2006

(54) DEVICE FOR TRANSMITTING MOTION BETWEEN THE ROTOR OF A SYNCHRONOUS PERMANENT-MAGNET MOTOR AND THE WORKING PART, HAVING AN INCREASED FREE ROTATION ANGLE

(75) Inventor: Elio Marioni, Dueville (IT)

(73) Assignee: Askoll Holding S.r.l., (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/057,676

(22) Filed: Feb. 14, 2005

(65) Prior Publication Data

US 2005/0147510 A1 Jul. 7, 2005

Related U.S. Application Data

(63) Continuation of application No. 10/101,752, filed on Mar. 21, 2002, now abandoned, which is a continuation-in-part of application No. 09/423,544, filed as application No. PCT/EP99/01715 on Mar. 16, 1999, now Pat. No. 6,384,508.

(30) Foreign Application Priority Data

Mar. 19, 1998 (IT) .............................. PD98A0058

(51) Int. Cl.
*F04B 17/03* (2006.01)
*F16D 3/68* (2006.01)

(52) U.S. Cl. ..................................... 417/423.1; 464/74

(58) Field of Classification Search ................ 416/185; 417/363, 420, 423.1, 424.1; 464/70, 73, 464/74

See application file for complete search history.

(56) References Cited

U.S. PATENT DOCUMENTS

| | | | |
|---|---|---|---|
| 1,627,964 A | 5/1927 | Galloway | |
| 4,661,085 A | 4/1987 | Carli | |
| 4,750,872 A | 6/1988 | Palliser | |
| 4,803,855 A | 2/1989 | Kennedy | |
| 4,861,240 A | 8/1989 | Marioni et al. | |

(Continued)

FOREIGN PATENT DOCUMENTS

EP 0 213 751 A1 3/1987

(Continued)

*Primary Examiner*—Michael Koczo, Jr.
(74) *Attorney, Agent, or Firm*—Akerman Senterfitt

(57) ABSTRACT

A device for transmitting motion between the rotor of a synchronous permanent-magnet motor and the working part, having an increased free rotation angle, which comprises at least two motion transmission couplings which mutually cooperate in a kinematic series. Each coupling is constituted by at least one driving element which is eccentric with respect to the rotation axis and is rigidly coupled to a first component of the motion transmission system and by at least one driven element, which is also eccentric with respect to the rotation axis and is rigidly coupled to the component arranged kinematically after the preceding one. The angle covered by the elements of each coupling is, as a whole, less than a round angle. The intermediate components of the kinematic transmission have both a driven element and a driving element for receiving the motion from the preceding one and transmitting it to a subsequent one.

8 Claims, 6 Drawing Sheets

U.S. PATENT DOCUMENTS 5,668,425 A 9/1997 Marioni et al.
6,210,116 B1 4/2001 Kuczaj et al.
6,217,452 B1 4/2001 Marioni
6,478,555 B1 11/2002 Kim et al.
5,668,425 A 9/1997 Marioni et al.
6,210,116 B1 4/2001 Kuczaj et al.
6,217,452 B1 4/2001 Marioni
6,478,555 B1 11/2002 Kim et al.

FOREIGN PATENT DOCUMENTS

| EP | 0 487 785 A1 | 6/1992 |
| EP | 0 514 272 A1 | 11/1992 |
| EP | 0 723 329 A1 | 7/1996 |
| EP | 0 945 622 A1 | 9/1999 |
| FR | 965 022 | 8/1950 |
| WO | WO 94/21026 | 9/1994 |

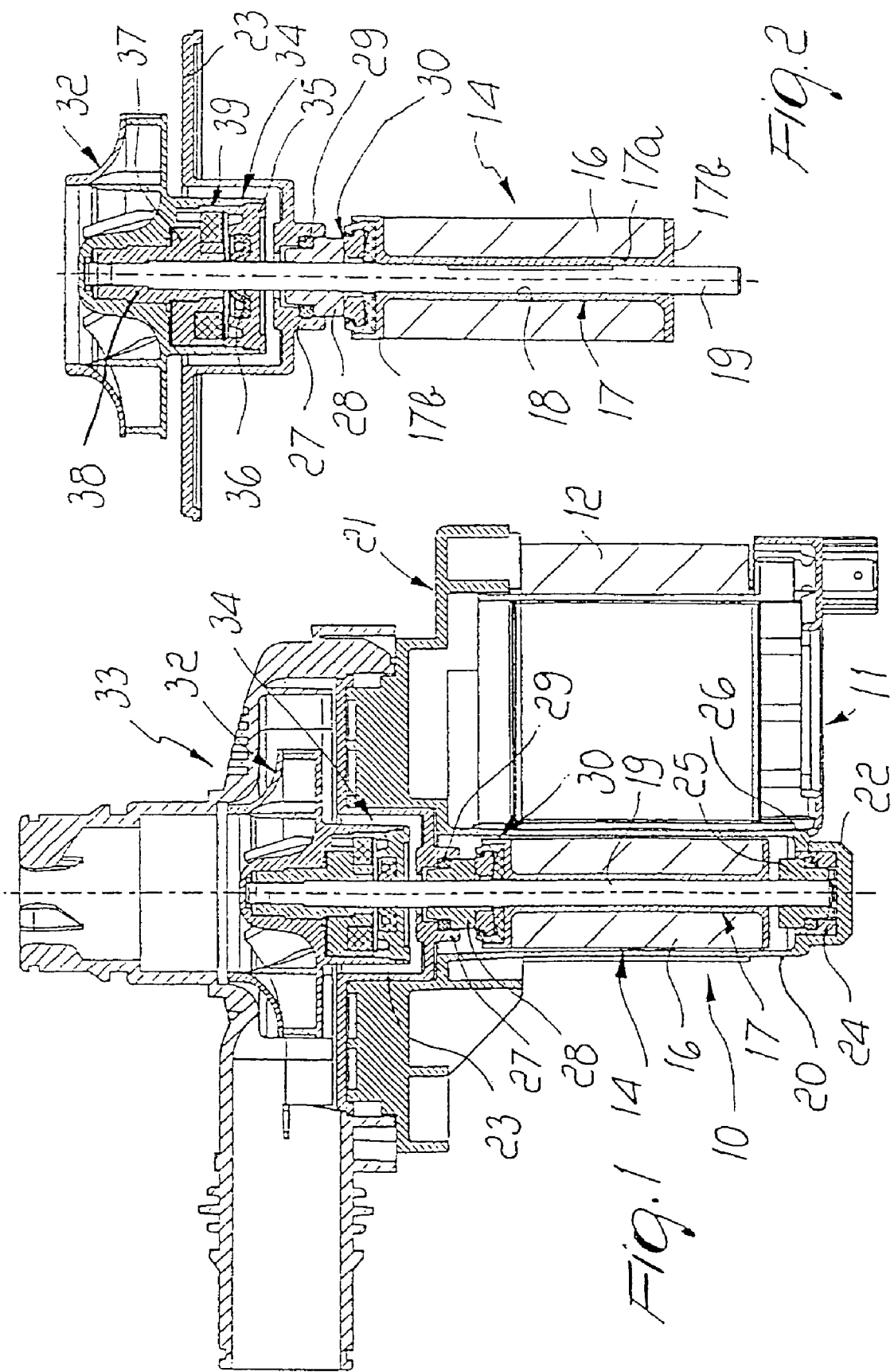

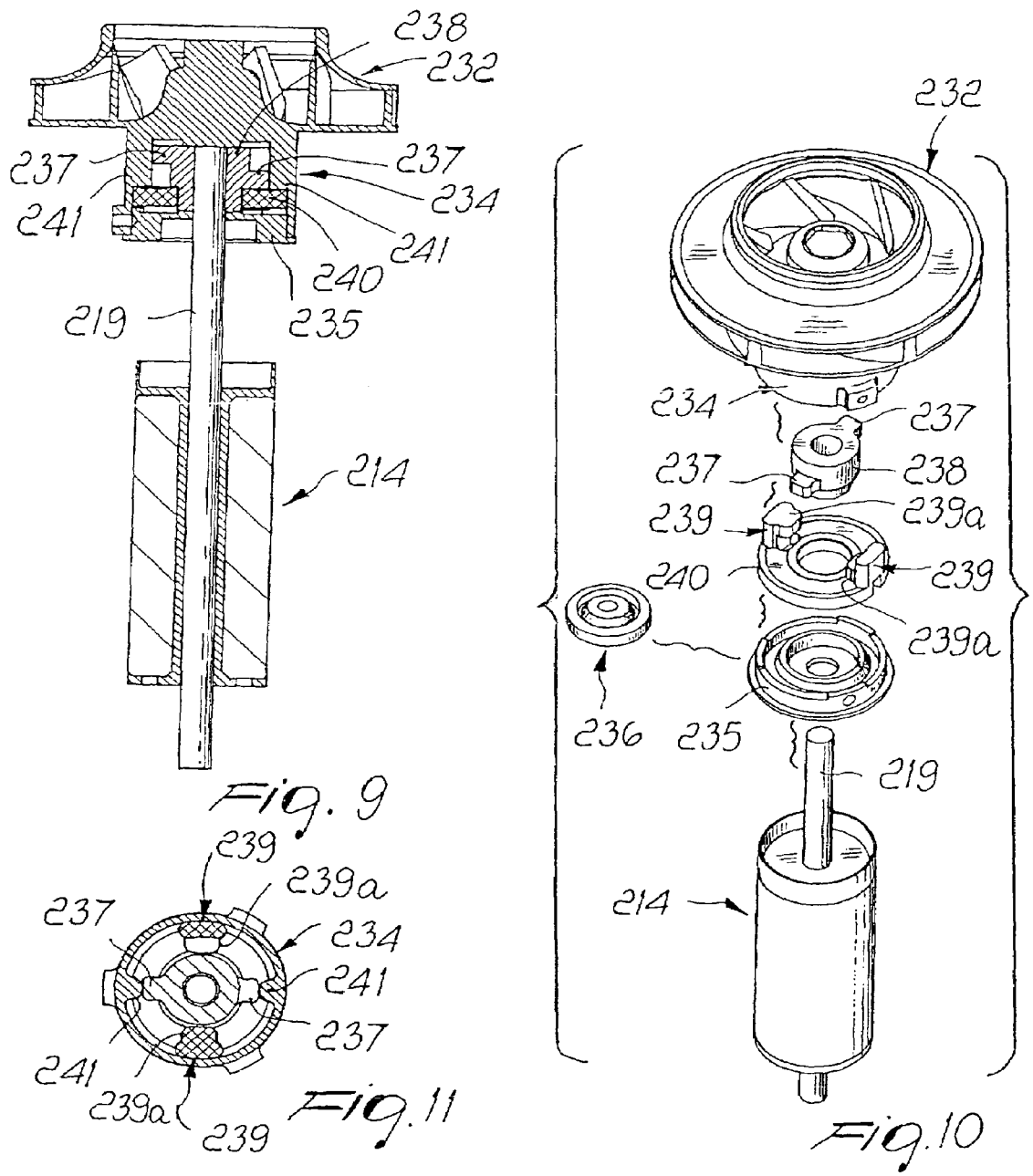

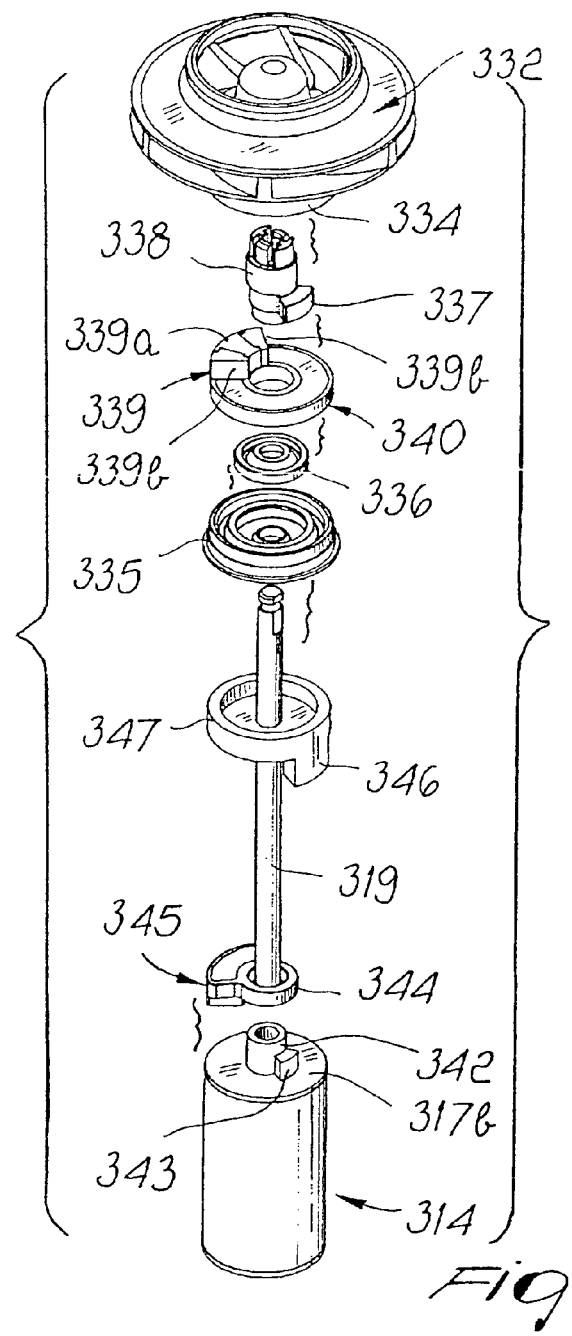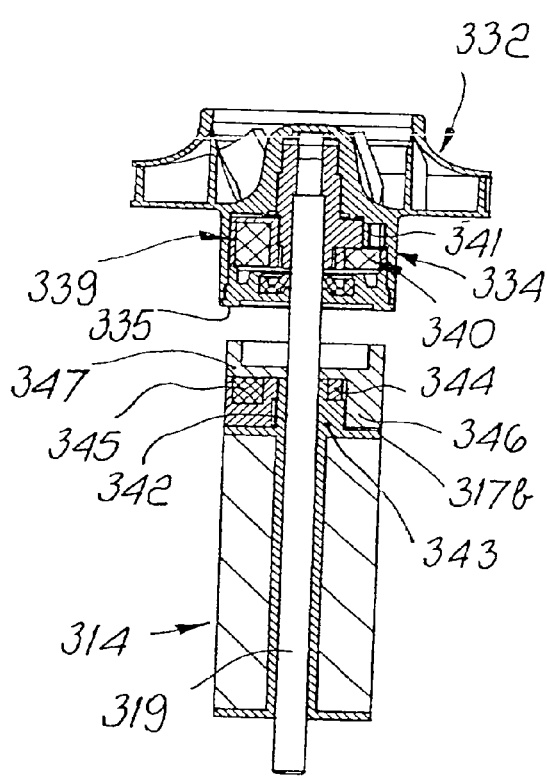
Fig. 13
Fig. 12

DEVICE FOR TRANSMITTING MOTION BETWEEN THE ROTOR OF A SYNCHRONOUS PERMANENT-MAGNET MOTOR AND THE WORKING PART, HAVING AN INCREASED FREE ROTATION ANGLE

CROSS-REFERENCE TO RELATED APPLICATION

This is a continuation of U.S. patent application Ser. No. 10/101,752, filed Mar. 21, 2002, now abandoned which is a continuation-in-part of U.S. patent application Ser. No. 09/423,544, filed Nov. 12, 1999 now U.S. Pat. No. 6,384,508.

BACKGROUND OF THE INVENTION

The present invention relates to a device for transmitting motion between the rotor of a synchronous permanent-magnet motor and the working part having an increased free rotation angle.

It is known that electric motors with permanent-magnet rotor have a structural layout which includes a stator, with an electromagnet constituted by a lamination pack and by associated windings, and a rotor which is arranged between two poles formed by the stator and is axially crossed by a shaft which is rotatably connected to a supporting structure.

It is also well-known that the higher the inertia of the load applied to a synchronous motor, the more difficult it is to start said motor.

Starting in fact occurs as a transient process in which the direction of rotation, the speed and the current change until synchronous operation is achieved.

During this transient process the rotor oscillates due to the alternating magnetic field produced by the stator, which by inducing a torque on the permanent-magnet rotor tends to move said rotor into a position in which the magnetic field of said rotor is aligned with the stator field.

If, during this hunting, the rotor acquires enough kinetic energy to move slightly out of its alignment position, it undergoes a further acceleration which makes it turn slightly further, and so forth, until synchronous operation is achieved.

For an equal power level, the extent of the oscillations produced in the rotor increases as the inertia of the applied load decreases; accordingly, the rotor is able to accelerate, acquiring a speed which allows it to synchronize with the alternating field of the stator.

If instead the inertia of the load is significant, the extent of the oscillation of the rotor is limited and synchronous operation cannot be achieved.

As the inertia of the load increases, the extreme situation occurs in which after power has been supplied to the stator the rotor cannot even begin its oscillation, i.e., it remains motionless in its equilibrium position.

When the inertia of the load is not too high with respect to the power of the motor (for example the impeller of a centrifugal pump), couplings of the mechanical type are currently widely used; said couplings are inserted between the load and the rotor and allow said rotor to oscillate freely, during starting, through a certain rotational angle.

This is the case of so-called toothed couplings, in which a first driving tooth is eccentric with respect to the rotation axis and is rigidly coupled to the rotor, while a second driven tooth is also eccentric with respect to the rotation axis and is rigidly coupled to the load.

In this manner, during the starting transient the rotor is disengaged from the inertia of the load and this makes it easier to achieve synchronous operation.

Accordingly, there is a free rotation through a certain angle (usually 180 sexagesimal degrees) followed by impact when the load is engaged, providing a direct connection between the load and the rotor, which are in practice rigidly coupled during operation.

Therefore the free rotation transient allows the motor to reach the synchronous state and to develop a torque which allows it to overcome the starting moment of inertia of the load.

After this starting transient, the torque, and therefore the power, required in the steady state is very often far lower than the static torque.

However, there are applications in which the moment of inertia of the load is so high (for example the impeller of a centrifugal pump used as a washing pump in dishwashers) that even the above mentioned couplings are unable to start it unless the motor is oversized to the point of being excessively expensive to manufacture and use and is therefore of no interest for the user.

As the inertia and resisting torques increase, the generated static torque must in fact also increase, with the obvious limits posed by the maximum stator flux allowed by permanent magnets, on penalty of demagnetizing them, and by the ability of the active components (iron and copper) to dissipate the temperatures generated due to the high circulating currents that occur even after the transient starting step has ended.

A further consequence is the high level of vibration generated due to the angular torque oscillations caused by a disproportionate choice of motor size in order to be able to produce the torque required for starting.

The effect of these oscillations, which are produced at every turn of the rotor, is to produce an instantaneous separation of the two teeth of the coupling, consequently generating noise.

The high static torque also makes it difficult to provide appropriate dimensions for the coupling owing to the intense stresses produced during impact and leads to the generation of excessive noise.

In such cases, it is thought that one solution for the initial driving of the load might be, apart from oversizing the motor, to increase the angle of free rotation of the rotor with respect to the load, i.e., to provide a greater uncoupling of the motor from the load during the starting transient.

This is currently constrained by the materials used for the parts of the coupling, particularly the teeth, which are usually made of plastics, as well as by the radial dimensions of the rotor, which are necessarily modest (on the order of a few tens of millimeters), bearing in mind that the impact of one tooth against the other during starting is considerable.

The interposition of shock-absorbing means, which is sometimes provided, worsens the situation because said means also require their own angular extension and accordingly their presence further reduces the available free rotation angle.

It is also known that synchronous permanent-magnet motors are bidirectional; i.e., at power-on the rotor can equally start turning clockwise or counterclockwise.

While this is not a problem in the case of the actuation of centrifugal pumps with radial vanes, it is a considerable limitation for centrifugal pumps which have a particular vane configuration and accordingly a single direction of rotation for the impeller.

SUMMARY OF THE INVENTION

The aim of the present invention is to provide a device for transmitting motion between the rotor of a synchronous permanent-magnet motor and the working part which increases the angle of freedom that can be provided at present.

Within the scope of this aim, a consequent primary object is to reduce the power level that is currently required in a permanent-magnet motor for starting because of the above-mentioned problems, bringing it closer to the power level absorbed in steady-state operation and therefore reducing the oversizing required for example to start loads having a particularly high inertia.

Another important object is to ensure that the power absorbed by the load in one direction of rotation is higher than the power that can be generated by the motor and that the power absorbed in the opposite direction of rotation is lower than the power that can be developed, achieving loss of synchronization or pitch, blocking and automatic reversal in the first of such directions of rotation and achieving driving in the opposite direction of rotation, thus determining a single direction of rotation.

Another object is to provide a device for transmitting motion which is constructively simple and compact.

Another object is to provide a device for transmitting motion which is silent when starting and during operation.

Another object is to provide a motor which as a whole has a low consumption and a low cost.

This aim, these objects and others which will become apparent hereinafter are achieved by a device for transmitting motion between the rotor of a synchronous permanent-magnet motor and the working part, characterized in that it comprises at least two motion transmission couplings which mutually cooperate in a kinematic series. Each coupling is constituted by at least one driving element which is eccentric with respect to the rotation axis and is rigidly coupled to a component of the motion transmission system and by at least one driven element, which is also eccentric with respect to the rotation axis and is rigidly coupled to the component arranged kinematically after the preceding component. The angle covered by the elements of each coupling are, as a whole, less than 360°, the at least one intermediate component of the kinematic transmission having both a driven element and a driving element for receiving the motion from a preceding component and transmitting it to a subsequent one. A resulting angle, which constitutes a free angle of rotation, is given by the sum of the angles of each coupling.

Advantageously, said motion transmission couplings are toothed, each coupling being constituted by at least one driving tooth, which is eccentric with respect to the rotation axis and is rigidly coupled to a component of the motion transmission system, and by at least one driven tooth, which is also eccentric with respect to the rotation axis and is rigidly coupled to the component arranged kinematically after the preceding one.

BRIEF DESCRIPTION OF THE DRAWINGS

Further characteristics and advantages of the invention will become apparent from the following detailed description of an embodiment thereof, illustrated by way of non-limitative example in the accompanying drawings, wherein:

FIG. 1 is a sectional view of a permanent-magnet electric motor coupled to a centrifugal pump by means of a device according to the invention in a first embodiment;

FIG. 2 is an axial sectional view of the rotor, of the device and of the impeller of FIG. 1;

FIG. 9 is an axial sectional view of a rotor of a motor of the device according to the invention in a third embodiment and of an impeller of a centrifugal pump;

FIG. 10 is an exploded perspective view of the device of FIG. 9;

FIG. 11 is a transverse sectional view of the device of FIG. 9;

FIG. 12 is an axial sectional view of a rotor of a motor of the device according to the invention in a fourth embodiment and of an impeller of a centrifugal pump;

FIG. 13 is an exploded perspective view of the device of FIG. 12;

DESCRIPTION OF THE PREFERRED EMBODIMENTS

Figure 3:
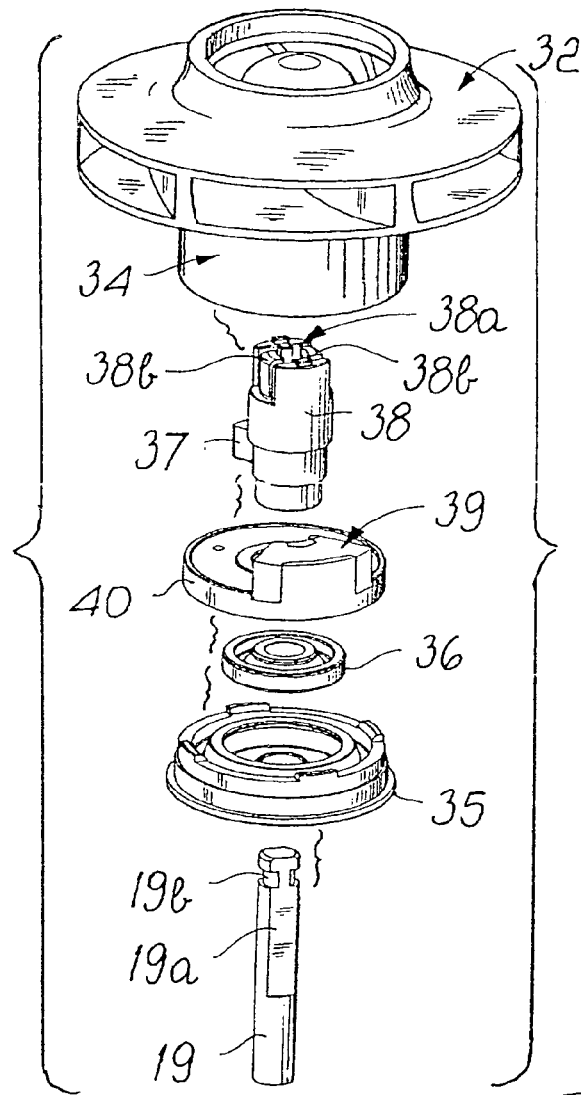
FIG. 3 is an exploded perspective view of the device of the preceding figures.
Figure 4:
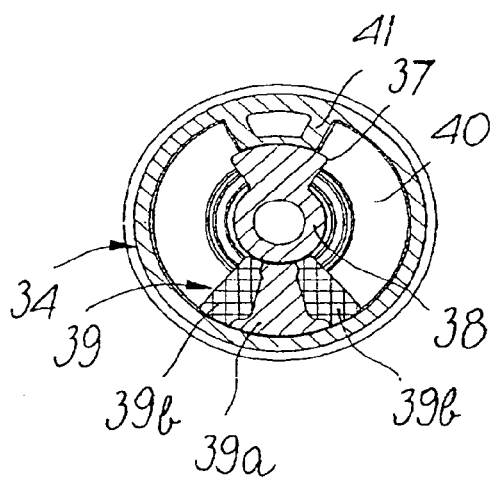
FIG. 4 is a transverse sectional view of the device of the preceding figures.
Figure 5:
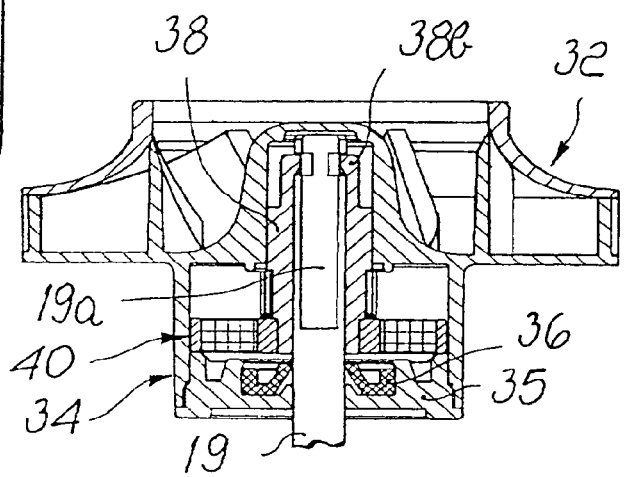
FIG. 5 is an enlarged-scale axial sectional view of the device, taken along a plane which is perpendicular of the plane of the sectional view of FIG. 2.

With reference to the above FIGS. 1 to 5, said figures illustrate a permanent-magnet electric motor, generally designated by the reference numeral 10, which comprises a stator 11, with a lamination pack 12 and windings (not shown), and a rotor 14, which is arranged between two poles formed by said lamination pack 12.

The rotor 14 is constituted by an annular cylindrical permanent magnet 16 whereon a plastic element 17 is overmolded, forming an internal shank 17a and end flanges 17b.

The rotor 14 accordingly has, as a whole, a cylindrical shape with an axial hole 18 in which a shaft 19 is rigidly inserted.

The shaft 19 is in turn supported by a cup-shaped element 20 (the chamber that contains the rotor 14) which belongs to a structure 21 for supporting the entire motor 10.

The cup-shaped element 20 contains the rotor 14, separating it from the stator 11.

The shaft 19 is rotatably coupled, in the vicinity of the shaped bottom 22 of the cup-shaped element 20, to a bushing 25.

The seat for an elastomeric ring 26 is formed between the bushing 25 and a similar bushing 24 accommodated in the bottom 22.

Likewise, bushings 27 and 28 are arranged between a closure element 23 which is arranged at the opposite end of element 20 to the bottom 22. The closure element 23 is fixed to the supporting structure 21, and the shaft 19 passes through the closure element 23. The bushings 27 and 28 form, between them, the seat for an elastomeric ring 29.

The shaft 19 passes through the bushing 28 and can rotate therein.

A thrust bearing, generally designated by the reference numeral 30, is arranged between the bushing 28 and the corresponding flange 17b.

According to the invention, between the rotor 14, and accordingly between the shaft 19 rigidly coupled thereto, and the working part, which in this case is constituted by an impeller 32 of a centrifugal pump generally designated by the reference numeral 33 and coupled to the electric motor 10, there is a motion transmission device. The motion transmission device comprises, in this case, two motion transmission couplings which mutually cooperate in a kinematic series.

Advantageously, the motion transmission couplings are of the toothed type and comprise, in an axial hollow body 34 which protrudes from the impeller 32 toward the rotor 14 and which is closed by a cover 35, a first tooth 37 which protrudes from a tang 38 which is keyed to the end of the shaft 19. The cover 35 preferably, but not necessarily, has a hermetic seal provided inside it, for example by gluing, gaskets, interference fit, ultrasonic welding, etcetera on the outer edge and an elastomeric lip-shaped ring 36 in the region where the shaft 19 passes.

The shaft 19 in fact has, on its end, two diametrically opposite flat regions 19a by means of which it couples to a complementarily shaped hole 38a of the tang 38.

Axial fixing is achieved by means of elastic hooks 38b of the tang 38 which enter an annular groove 19b of the shaft 19.

The first tooth 37 is arranged eccentrically with respect to the shaft 19, has a limited radial extension and constitutes a driving tooth for a second tooth 39 which protrudes axially from an intermediate annular element 40 which can rotate freely in the hollow body 34 with respect to the shaft 19 and to said hollow body 34.

The second tooth 39 is composed of an internal supporting part 39a made of rigid plastics and of two mutually opposite external parts 39b which are overmolded on the preceding one, are made of elastomer and form the contact surfaces.

The second tooth 39 might of course also be provided monolithically without overmolding, using for example a hard elastomeric material.

The radial extension of the second tooth 39 affects all of the region between the tang 38 and the outer wall of the hollow body 34, providing of course clearances which allow free movement or providing a slight interference (achieving a friction engagement) for example with a circumferential elastomeric element, not shown. The second tooth 39 has an axial extension which allows it to make contact with the first tooth 37 and with a third tooth 41 which protrudes radially from the internal wall of the hollow body 34 to the vicinity of the external profile of the first tooth 37.

The second tooth 39 is therefore a tooth which is driven by the first tooth 37 and drives the third tooth 41, interacting therewith through the elastomeric parts 39b.

The angle covered by the assembly constituted by the first tooth 37 and by the second tooth 39 is smaller than a round angle (360°) and so is the angle covered by the assembly constituted by the second tooth 39 and by the third tooth 41. The angle covered by the two assemblies together is the sum of the angle of each assembly. When the electric motor 10 is actuated and the rotor 14 begins its rotation, the first tooth 37, i.e., the tooth that is rigidly coupled thereto, starts to rotate; during its rotation it encounters the second tooth 39 and moves it.

The second tooth, being moved, then encounters the third tooth 41 and therefore at this point the impeller 32, which is monolithic therewith, is turned.

Conveniently, it is possible to introduce in the hollow body 34 a fluid having an adequate viscosity with lubricating, impact-damping and noise-deadening functions.

The motion transmission device is thus composed of two couplings which mutually cooperate in a kinematic series; a first one of said couplings is constituted by a driving element, which is eccentric with respect to the rotation axis (the first tooth 37) and is rigidly coupled to a component of the intermediate motion transmission system (the rotor 14), and by a driven element (the second tooth 39 with the corresponding part 39b), which is also eccentric with respect to the rotation axis and is rigidly coupled to the component arranged kinematically after the preceding one (the annular element 40).

A second one of these couplings is composed of a driving element (the second tooth 39 with one of its parts 39b), which is rigidly coupled to a component of the motion transmission system (the annular element 40), and of a driven element (the third tooth 41), which is rigidly coupled to the component of the motion transmission system that is arranged kinematically to follow (in this example the impeller 32).

In practice it has been observed that coupling in a kinematic series at least two toothed motion transmission couplings increases the angle of freedom between the rotor and the working part (in this case, the impeller) that can currently be provided, and this has the beneficial effect of reducing the power currently required for starting in a permanent-magnet motor.

This advantage accordingly allows a reduction in the oversizing that is currently necessary to start loads having a particularly high inertia, as in the described case of a centrifugal pump.

By designing the vanes of the impeller with a configuration which is not radial but has an adequate curvature, the power absorbed by the load (the impeller and the working fluid) in one direction of rotation (the direction in which the impeller has the lowest efficiency) is higher than the available power of the motor and is lower in the opposite direction of rotation (the direction in which the impeller has the highest efficiency).

In the first case, the impeller 32 loses its synchronization or pitch with respect to the rotor 14, blocks and then automatically reverses its motion, while normal driving occurs in the second case.

Accordingly, a unidirectional motor has thus been obtained without any electric/electronic or mechanical device.

Figure 7:
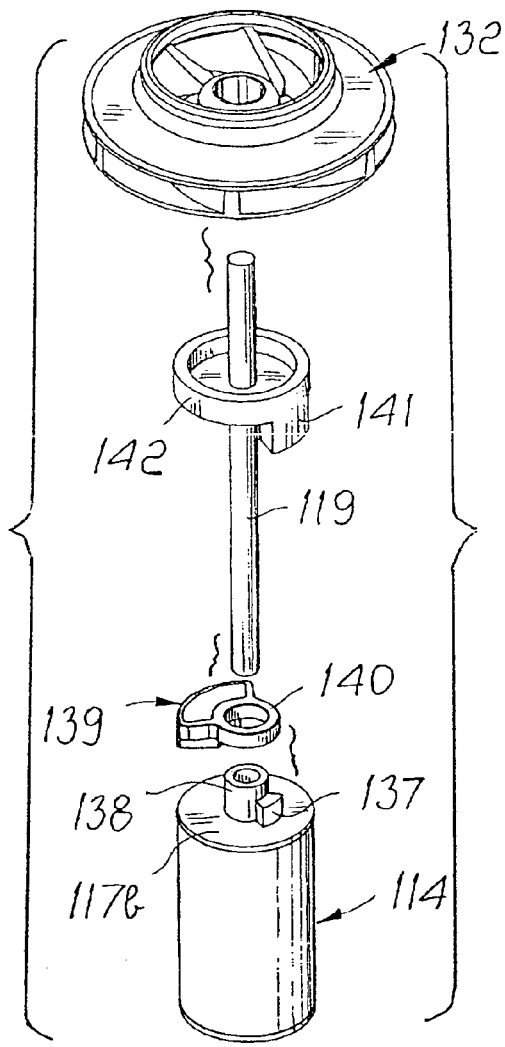
FIG. 7 is an exploded perspective view of the device of FIG. 6.
Figure 8:
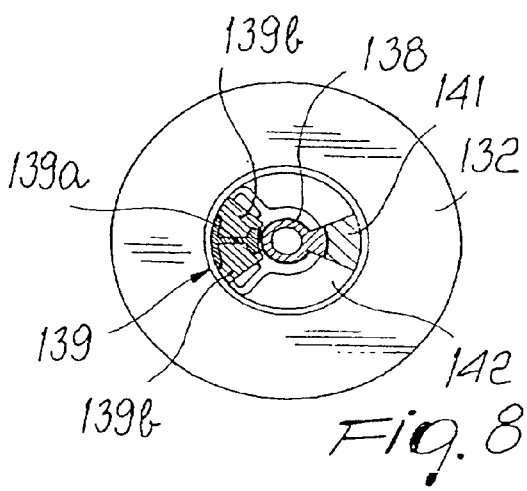
FIG. 8 is a transverse sectional view of the device of FIG. 6.
Figure 6:
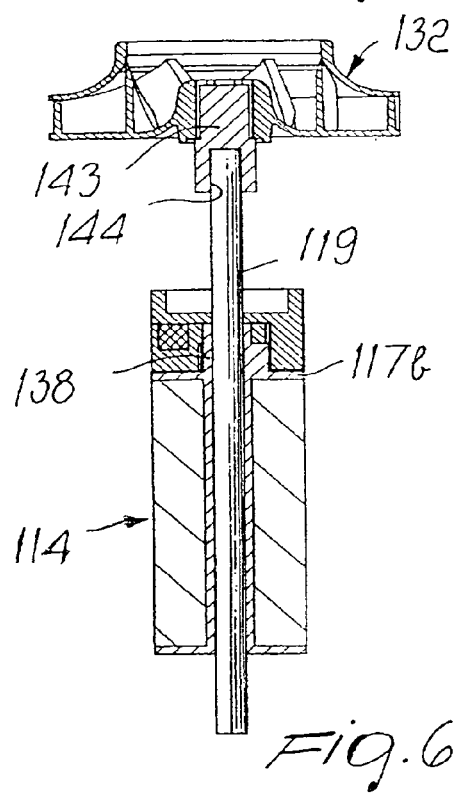
FIG. 6 is an axial sectional view of a rotor of a motor of the device according to the invention in a second embodiment and of an impeller of a centrifugal pump.

With reference now to the above FIGS. 6 to 8, a second embodiment of the motion transmission device has a shaft 119 which can rotate freely with respect to the rotor 114.

In this case, an axial tang 138 protrudes from the head flange 117b of the rotor 114 and has a first eccentric tooth 137 which has a limited radial extension.

The axial extension of the first tooth 137 is approximately half of the axial extension of the tang 138; at leat one annular element 140 is arranged on the other half so that it can rotate freely, and a second tooth 139 protrudes from said annular element; the axial dimensions of said tooth allow it to make contact with the first tooth 137 and with a third tooth 141 which occupies the radial space outside the first tooth 137 and protrudes from another annular element 142 which is rigidly coupled to the shaft 119.

In this case also, the second tooth 139 has an internal supporting part 139a and two external parts 139b made of elastomeric material.

As an alternative, the second tooth 139 might be monolithic.

The impeller, now designated by the reference numeral 132, is rigidly coupled to a pin 143 which is keyed in an axial hole thereof; the pin in turn is keyed to the end of the shaft 119 which is inserted in a suitable hole 144 of said pin.

In this case also, the rotation of the rotor 114 sequentially produces the transmission of motion between the first tooth 137, the second tooth 139 and respectively the third tooth 141, which is rigidly coupled to the shaft 119, and with the impeller 132.

With reference now to the above FIGS. 9 to 11, a third embodiment of the motion transmission device again has, between the rotor 214, and consequently between the shaft 219 rigidly coupled thereto, and the working part, which in this case also is constituted by an impeller 232 of a centrifugal pump which is coupled to the electric motor, two toothed motion transmission couplings which comprise, in an axial hollow body 234 which is monolithic with the impeller 232 and, in this case, is closed hermetically by a cover 235 with a lip-shaped gasket 236, two first teeth 237 which protrude in diametrically opposite positions from a first annular element 238 which is keyed to the shaft 219.

The first teeth 237 are arranged eccentrically with respect to the shaft 219, have a limited radial extension and constitute driving teeth for two second teeth 239 which protrude axially from a second annular element 240 which can rotate freely in the hollow body 234 with respect to the shaft 219 and to said hollow body 234.

The second teeth 239 also are diametrically mutually opposite.

The first teeth 237 are arranged axially in offset positions and the second teeth 239 are shaped so as to have parts 239a which protrude radially so as to affect all of the region between the tang 238 and the external wall of the hollow body 234, providing of course clearances which allow free movement or providing slight interference, producing a friction engagement, for example with a circumferential elastomeric element, not shown.

The second teeth 239 have an axial extension which allows them to also make contact with two third teeth 241 which are also diametrically opposite and protrude radially from the internal wall of the hollow body 234 in axially offset positions.

The second teeth 239 are therefore teeth which are driven by the first teeth 237 and drive the third teeth 241.

In this case, the parts, and therefore the masses, that rotate are arranged symmetrically with respect to the shaft 219 and therefore rotation is balanced.

With reference now to the above FIGS. 12 and 13, a fourth embodiment of the motion transmission device has, between the shaft 319 and the working part, in this case also constituted by an impeller 332 of a centrifugal pump, four toothed motion transmission couplings which cooperate with each other in a kinematic series.

Advantageously, two motion transmission couplings are arranged in an axial hollow body 334 which protrudes from the impeller 332 toward the rotor 314 and is closed by a cover 335, preferably so that a hermetic seal is formed inside it and therefore for example by gluing or by means of the other methods already mentioned, on the outer rim, and a lip-shaped ring 336 in the region where the shaft 319 passes.

In the hollow body 314 there is therefore a first tooth 337 which protrudes from a tang 338 which is keyed to the end of the shaft 319.

The first tooth 337 is arranged eccentrically with respect to the shaft 319, has a limited radial extension and constitutes a driving tooth for a second tooth 339 which protrudes axially from an annular element 340 which can rotate freely in the hollow body 334 with respect to the shaft 319 of said hollow body 334.

The second tooth 339 is composed of an internal supporting part 339a made of rigid plastics and of two mutually opposite external parts 339b which are overmolded on the internal part, are made of elastomeric material, and form the contact surfaces.

In this case also it is possible to provide the second tooth 339 monolithically.

The radial extension of the second tooth 339 affects all of the region between the tang 338 and the external wall of the hollow body 334, providing of course clearances which allow free movement or providing a slight interference, producing a friction engagement, for example with a circumferential element made of elastomeric material, not shown.

The second tooth 339 has an axial extension which allows it to make contact with the first tooth 337 and with a third tooth 341 which protrudes radially from the internal wall of the hollow body 334 to the vicinity of the external profile of the first tooth 337.

The second tooth 339 is therefore a tooth which is driven by the first tooth 337 and drives the third tooth 341, interacting with them by means of the elastomeric parts 339b.

The angle covered by the assembly constituted by the first tooth 337 and the second tooth 339 is smaller than a round angle and so is the angle covered by the assembly constituted by the second tooth 339 and by the third tooth 341.

The motion transmission device, in this case, again has an axial tang 342 which protrudes from the head flange 317b of the rotor 314 and has a fourth eccentric tooth 343 which has a limited radial extension.

The axial extension of the fourth tooth 343 is approximately half of the axial extension of the tang 342; an annular element 344 is arranged on the other half so that it can rotate freely, and a fifth tooth 345 protrudes from it; the axial extension of the fifth tooth is such that it can make contact with the fourth tooth 343 and with a sixth tooth 346 which occupies the radial space outside the fourth tooth 343 and protrudes from another annular element 347 which is rigidly coupled to the shaft 319.

The fifth tooth 345 has an internal supporting part and two external parts made of elastomeric material which are not shown in the figures.

In this case, the rotation of the rotor 314 produces, in sequence, the transmission of motion between the fourth tooth 343, the fifth tooth 345 and then the sixth tooth 346, which is rigidly coupled to the shaft 319.

The shaft begins its rotation and the first tooth 337, the one that is rigidly coupled thereto, then begins to rotate and encounters, in its rotation, the second tooth 339, moving it.

The second tooth, being driven, then encounters the third tooth 341 and then at this point the impeller 332, which is monolithic with respect to the third tooth, is turned. In the particular embodiment just described it is disclosed that one of the objects of the present invention is to provide a free angle between the rotor and the external load as large as needed, in order to start and synchronize the permanent magnet synchronous motor with the external load (in this particular example a pump impeller). The present invention teaches the use of a convenient number (in this specific example two) of annular elements which can freely rotate, such as elements 340 and 344 as in this specific example, in order to obtain a free angle of rotation, being given by the sum of the angles of each particular coupling element.

Figure 14:
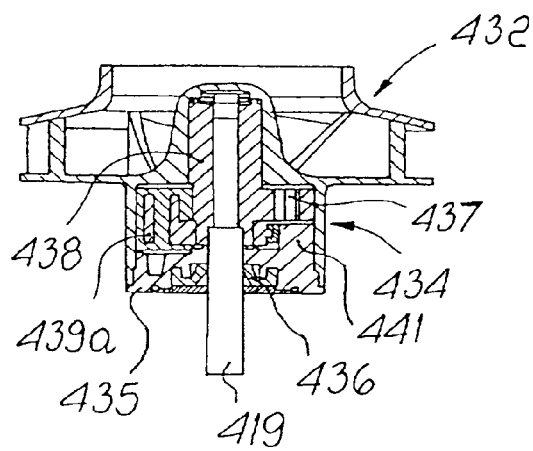
FIG. 14 is an axial sectional view of the device according to the invention in a fifth embodiment and of an impeller of a centrifugal pump.
Figure 16:
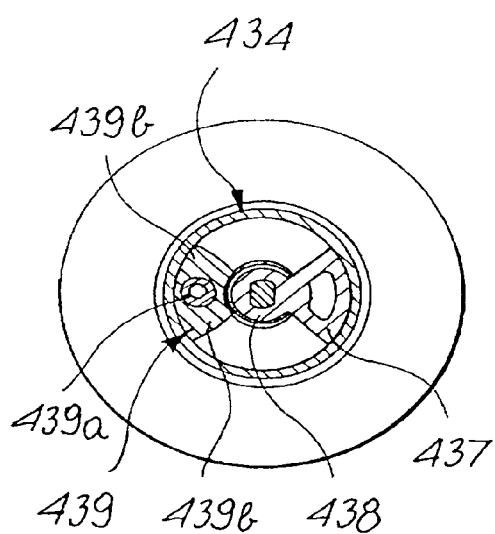
FIG. 16 is a transverse sectional view of the device of FIG. 14.
Figure 15:
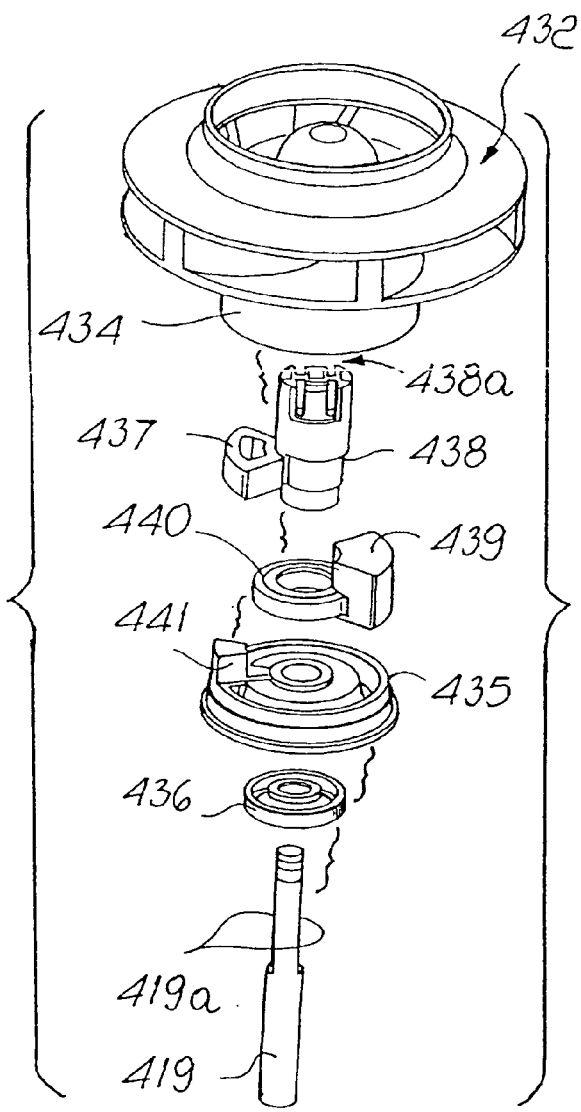
FIG. 15 is an exploded perspective view of the device and of the impeller of FIG. 14.

With reference to FIGS. 14, 15 and 16, a fifth embodiment of a motion transmission device has, between the shaft 419 and the working part, which in this configuration also is the impeller 432 of a centrifugal pump, two motion transmission couplings which mutually cooperate in a kinematic series.

In this case, such couplings are arranged inside an axial hollow body 434 which protrudes from the impeller 432 toward the rotor, which is not shown in the above figures for the sake of simplicity, and is closed by a cover 435.

Preferably, said cover 435 closes said hollow body 434 by gluing, ultrasonic welding, or other methods, so as to ensure hermetic tightness internally.

In the region where the shaft 419 passes through cover 435 there is a lip-shaped ring 436 made of elastomeric material.

Inside the hollow body 434 there is a first tooth 437 which protrudes from a tang 438 which is keyed to the end of the shaft 419.

Such end in fact has two diametrically opposite flat regions 419a with which a complementarily shaped hole 438a of the tang 438 mates.

The first tooth 437 is eccentric with respect to the shaft 419 and has a limited axial extension; it constitutes a driving tooth for a second tooth 439 which protrudes axially from an annular element 440 which can rotate freely, inside the hollow body 434, with respect to the shaft 419.

The second tooth 439 has an internal supporting part 439a made of rigid plastics which is monolithic with the annular element 440, which in this case has a substantially cylindrical structure, and is embedded in the remaining part 439b made of elastomeric material, which is overmolded on the preceding one and forms the contact surfaces.

In this case also, the third tooth 439 might be provided monolithically.

The radial extension of the second tooth 439 affects all of the region between the tang 438 and the internal wall of the hollow body 434.

Clearances are of course provided which allow free motion or, as an alternative, there is a slight interference which produces friction engagement, for example by resorting to a circumferential element made of elastomeric material which is not shown for the sake of simplicity.

The second tooth 439 has an axial extension which allows it to make contact with the first tooth 437 and with a third tooth, now designated by the reference numeral 441, which protrudes axially from said cover 435 from a position which is proximate to the outer profile of the face that is directed toward the inside of the hollow body 434.

In particular, the axial extension of the third tooth 441 is such that it can make contact only with the elastomeric external parts 439b of the second tooth 439 but cannot make contact with the first tooth 437.

The second tooth 439 is accordingly driven by the first tooth 437 and in turn drives the third tooth 441 by means of the elastomeric parts 439b.

The angle covered by the assembly constituted by the first tooth 437 and by the second tooth 439 is less than a round angle and so is the angle covered by the second tooth 439 together with the third tooth 441.

When the motor is started, the first tooth 437 therefore starts to rotate rigidly with the rotor until it encounters, during its rotation, the second tooth 439, which it moves.

The second tooth therefore starts to rotate concordantly with the rotor until it encounters the third tooth 441, which is rigidly coupled to the hollow body 434 and accordingly to the impeller 432, which is therefore turned. If the coupling between the permanent magnet synchronous motor and the external load requires an increased free rotation angle in order to start and synchronize the motor with the load, this can be obtained in this particular embodiment by inserting a convenient number of annular freely rotating elements like element 440 between the motor and the applied load.

In practice it has been observed that in all its embodiments the invention has achieved the intended aim and objects.

The invention thus conceived is susceptible of numerous modifications and variations, all of which are within the scope of the inventive concept.

All the details may also be replaced with other technically equivalent elements.

In practice, the materials employed, so long as they are compatible with the contingent use, as well as the dimensions, may be any according to requirements.

The disclosures in Italian Patent Application No. PD98A000058 from which this application claims priority are incorporated herein by reference.

The invention claimed is:

1. A device for transmitting motion between the rotor of a synchronous permanent-magnet motor and a working part, comprising:
    at least two motion transmission couplings which mutually cooperate in a kinematic series, the couplings being arranged with respect to a shaft defining a rotation axis,
    each said coupling being constituted by
        at least one driving element which is eccentric with respect to the rotation axis and which is rigidly coupled to a motion transmission component, and by
        at least one driven element, which is also eccentric with respect to the rotation axis and which is rigidly coupled to a motion transmission component arranged kinematically after the preceding component coupled to the at least one driving element, the angle covered by the driving and driven elements of each coupling being, as a whole, less than 360°,
    wherein at least one intermediate motion transmission component of the kinematic transmission comprises both a driven element and a driving element for receiving the motion from a preceding motion transmission component and transmitting it to a subsequent motion transmission component, a resulting free angle of rotation being given by a sum of the angles of each coupling,
    wherein a first one of said couplings is constituted by a first tooth which is rigidly coupled to the rotor of the motor and by a second tooth which is rigidly coupled to an annular element which can rotate freely with respect to said rotor, and
    wherein a second one of said couplings is composed of said second tooth and a third tooth which is rigidly coupled to the working part, said second tooth forming said at least one intermediate component.

2. The device according to claim 1, wherein said motion transmission couplings are toothed, each coupling being constituted by at least one driving tooth, which is eccentric with respect to the rotation axis and is rigidly coupled to a component of the motion transmission system, and by at least one driven tooth, which is also eccentric with respect to the rotation axis and is rigidly coupled to the component that kinematically follows the preceding one.

3. The device according to claim 1, wherein said motion transmission couplings are arranged in an axial hollow body which is rigidly coupled to said working part and is closed by a cover.

4. The device according to claim 3, wherein said first tooth protrudes from a tang which is keyed on the end of said shaft,
   said first tooth being arranged eccentrically with respect to said shaft and constituting a driving tooth for said second tooth which protrudes axially from an annular element which can rotate freely in said hollow body with respect to said shaft and to said hollow body,
   said second tooth having an extension which allows it to make contact with said first tooth and with said third tooth which protrudes from the internal wall of the hollow body.

5. The device according to claim 4, wherein said first tooth has a radial extension which extends into and partially affects the internal space of said hollow body,
   the radial extension of said second tooth affecting the region between said tang and the external wall of said hollow body, providing clearances which allow free movement, said second tooth having an axial extension which allows it to make contact with said first tooth and with said third tooth,
   said third tooth protruding radially from the internal wall of said hollow body to the vicinity of the external profile of said first tooth.

6. The device according to claim 2, wherein at least one of said teeth is composed of an internal supporting part which is made of rigid plastics and of two mutually opposite external parts which are overmolded on the internal part, are made of elastomeric material, and form the surfaces for contact with the other teeth.

7. The device according to claim 1, wherein a slight interference is provided between the mutually moving parts, producing a friction engagement.

8. The device according to claim 1, wherein said working part is an impeller with curved vanes of a centrifugal pump.

* * * * *